United States Patent [19]

Worcester

[11] Patent Number: 4,705,945

[45] Date of Patent: Nov. 10, 1987

[54] NARCISSUS CORRECTION FOR INFRARED SCANNING MICROSCOPE

[75] Inventor: Peter C. Worcester, Fairfield, Conn.

[73] Assignee: Barnes Engineering Company, Shelton, Conn.

[21] Appl. No.: 824,488

[22] Filed: Jan. 31, 1986

[51] Int. Cl.[4] .................................................. G01J 5/06
[52] U.S. Cl. ..................................... 250/334; 250/352
[58] Field of Search ............... 250/332, 352, 330, 334; 358/113

[56] References Cited

U.S. PATENT DOCUMENTS 4,450,479  5/1984  Horne ................................... 250/332

FOREIGN PATENT DOCUMENTS 141683  12/1978  Japan .................................... 250/352
 79577   6/1980  Japan .................................... 358/113

Primary Examiner—Carolyn E. Fields
Attorney, Agent, or Firm—Parmelee, Bollinger & Bramblett

[57] ABSTRACT

The cooled infrared detector of an infrared microscope is scanned over a target specimen at ambient temperature, the signal is stored, inverted and added to subsequent radiance signals derived from subsequent scans of the target to provide a continuous correction for the "Narcissus Effect".

1 Claim, 2 Drawing Figures

NARCISSUS CORRECTION FOR INFRARED SCANNING MICROSCOPE

BACKGROUND OF THE INVENTION

This invention relates to a method for correcting the "Narcissus Effect" in a scanning infrared microscope employing a cooled infrared detector.

Scanning infrared radiometers have found important applications in non-destructive testing of miniature and microelectronic components, chips and printed circuits. Characteristic thermal patterns for a component or circuit can be determined and measured by scanning a cooled infrared detector over the target area. Magnifying objective lenses are employed for imaging individual pixels of the field of view on the detector as it is scanned over the target. Cooling of the detectors to extremely low temperatures is required for sensivity.

It has been found in scanning radiometers of the type described that low emissivity targets have provided seriously erroneous temperature readings even when the emissivity of the target has been measured and is used in computing the temperature of the various components or pixels of the target. It has been found that the errors are caused by viewing the cold detector and its associated Dewar through reflections from the target or specimen which is known as the "Narcissus Effect". If the emissivity of the target, which is defined as the ratio of the radiation emitted by an object to the radiation that would be emitted by a black body at the same temperature, is unity or that of the black body, there would be no problem. However, as a practical matter the emissivity of all materials is less than one, and the lower the emissivity of the target the worse the "Narcissus Effect".

SUMMARY OF THE INVENTION

Accordingly, it is an object of the present invention to provide an improved emissivity correction which provides compensation for the "Narcissus Effect" in an infrared scanning radiometer or microscope.

Still a further object of this invention is to provide a new and improved method of correcting for the "Narcissus Effect" of an infrared scanning microscope employing a cooled infrared detector which is simple, easy to implement and requires no extra procedures or steps once the method is setup.

In carrying out this invention in one illustrative embodiment thereof, a method is provided for correcting for the "Narcissus Effect" of an infrared scanning microscope employing a cooled infrared detector which comprises the steps of scanning a target specimen at ambient temperature and storing the ambient temperature radiance signals detected therefrom by the infrared detector. The stored ambient temperature radiance signal is inverted and added to subsequent radiance signals derived from subsequent scans of the target for providing a correction for the "Narcissus Effect".

BRIEF DESCRIPTION OF THE DRAWINGS

The invention, together with further objects, aspects, features and advantages thereof will be more clearly understood from the following description considered in connection with the accompanying drawings.

DESCRIPTION OF THE PREFERRED EMBODIMENT

Figure 1:
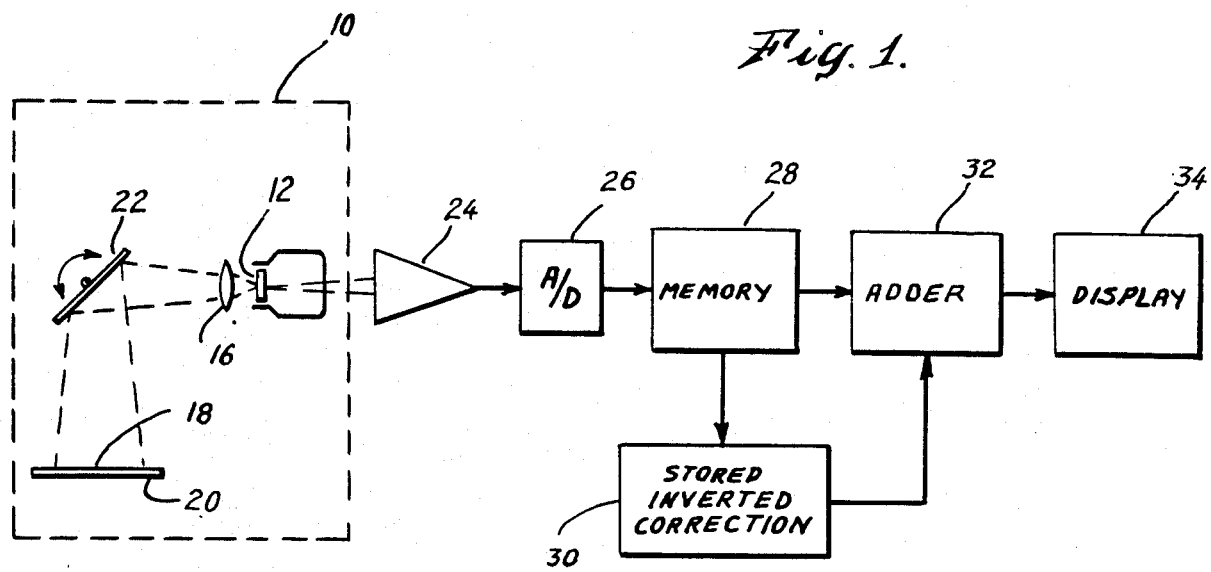
FIG. 1 is a block diagram of a scanning infrared microscope employing method of compensating for the "Narcissus Effect" embodied in the present invention.
Figure 2:
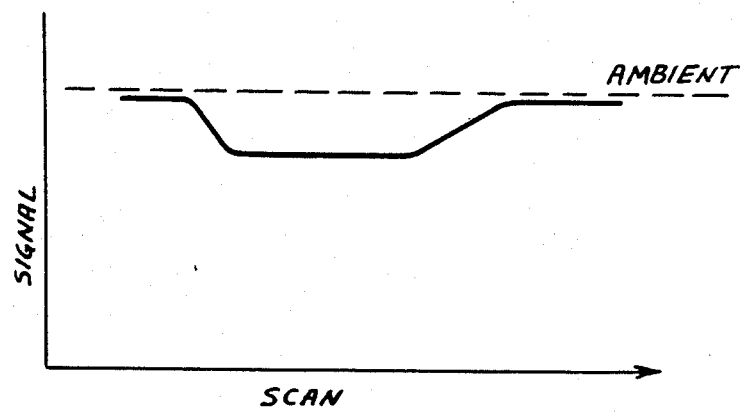
FIG. 2 illustrates a curve of an ambient temperature signal generated by the target of the scanning radiometer of FIG. 1 illustrating the "Narcissus Effect" that is corrected by employing the method embodying this invention.

Referring now to FIG. 1, an infrared scanning radiometer or microscope, referred to generally with the reference numeral 10, includes a cooled, infrared detector such as an indium antimonide, lead telluride, lead sulfide, etc., which is housed in a Dewar adapted to cool the detector to extremely low temperatures using, for example, liquid nitrogen. An objective lens 16 images a pixel or point on the target 20 onto the cooled infrared detector 12 via a scanning mirror 22 which moves the detector across the target in any suitable manner. One form of infrared scanning microscope which may be employed is manufactured by Barnes Engineering Company of Stamford, Conn. and is referred to as the CompuTherm. However, the type of infrared microscope is not important as the problem will be common to any type of scanning microscope or radiometer in which the cold detector views itself and its dewar through reflection from the specimen being examined which is known as the "Narcissus Effect". This type of effect is illustrated in FIG. 2 where the signal generated by a scan line across the target 20 produces a signal which is indicative of a temperature below the ambient temperature in which the target is being examined providing an indication that the target is colder than the ambient temperature. If the ambient temperature of the surroundings of the target 20 is not changed and the target is subjected to its regular operating or test voltages or other electrical characteristics in which it is desired to be operated, the error shown in FIG. 2 will exist on any measurement which is made.

Accordingly, a correction method is provided in which the radiance signal generated by scanning, the detector 12 over the target or specimen 20 is amplified by the amplifier 24 and applied to an analog/digital convertor 26 and placed in memory 28. An ambient temperature radiance signal which is made of the target before temperatures measurements are made e.g., similar to the signal illustrated in FIG. 2, is stored in storage 30. On all subsequent scans of the scanner 22, the stored correction ambient temperature radiance signal is inverted and applied to a summer or adder circuit 32 along with the scan line to be corrected from memory 28 such that the inverted signal is added for providing a correction for the "Narcissus Effect" which is then applied to a suitable display 34 which may be in the form of a cathode ray tube, a recorder, printer or any other means for displaying or recording the results produced by the infrared microscope 10. Therefore, in accordance with the method of this invention, the target being examined is brought to a uniform ambient temperature, scanned and the ambient temperature radiance signal derived therefrom by the infrared detector is stored, inverted and then added to subsequent scans as a correction for the fact that the target does not have unity emissivity and accordingly, the detector sees itself reducing the signal that it would otherwise generate in response to viewing the field of view.

The procedures in using the scanning infrared microscope for providing this correction need not be altered as the required information is inherently contained in data taken to measure the emissivity which as pointed out would be necessary to obtain absolute temperatures for the target. The correction may be obtained and employed automatically as follows:

Let:

$N_T$ = Apparent radiance of a target pixel at temperature T $N_B$ = Blackbody radiance at temperature T $N_A$ = Ambient radiance $N_C$ = Narcissus correction .

Then:

$$N_T = e\, N_B + (1-e)(N_A - N_C), \text{ where } e = \text{emissivity} \quad \text{(Eq. 1)}$$

$N_C$ is the "cold" contribution of the detector 12 and dewar 14 by reflection. It is independent of the target temperature T, but does depend upon the location of the pixel within the field. If $e=1$, the contribution of $N_C$ goes to zero as it should. Since the second term is independent of T, it is called a constant K for each pixel.

$$K = (1-e)(N_A - N_C) \quad \text{(Eq. 2)}$$

$$N_T = e\, N_B + K \quad \text{(Eq. 3)}$$

Applying Equation 1 or 3 at two temperatures $T_1$ and $T_2$, subtracting and solving the difference between the difference equation for e gives:

$$e = \frac{N_{T2} - N_{T1}}{N_{B2} - N_{B1}} \quad \text{(Eq. 4)}$$

The constant K drops out giving the same equation (4) that is presently used for computing e. Thus, it can be seen that the Narcissus Effect does not cause any error in emissivity.

Knowing e, K can be calculated for each pixel from Equation 3 for either of the constant temperatures radiance images used in determing the emissivity.

$$K = N_{T1} - e\, N_{B1}$$

or $$K = N_{T2} - e\, N_{B2}$$

This would be done automatically at the same time e is computed to give two stored arrays, one for e and one for K.

Now to determine the temperature from measured apparent radiance, compute $N_B$ using Equation 3 and the stored values of e and K.

$$N_B = \frac{N_T - K}{e} \quad \text{(Eq. 5)}$$

Accordingly, the Narcissus correction may be done automatically by software. There is a requirement for storing a K array in addition to the e array.

Thus, the method for correcting Narcissus Effect may be readily implemented in existing scanning radiometers of the type described without substantial changes in equipment or proceedures. The Narcissus Effect which varies with the particular scanning angles of the detector with respect to the target or specimen being scanned is completely compensated for over the entire area of the target.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A method of correcting for the "Narcissus Effect" of an infrared scanning microscope employing a cooled infrared detector comprising the steps of:

scanning a target at a first uniform temperature so as to provide a first temperature radiance signal from said infrared detector, scanning a target at a second uniform temperature so as to provide a second temperature radiance signal from said infrared detector, selecting said first or second temperature to correspond to the ambient temperature in which said scan is made, storing said first and second signals, inverting the ambient temperature signal, and combining the inverted signal along with the other stored signal with subsequent radiance signals derived from subsequent scans of the target so as to provide a correction for both emissivity and the "Narcissus Effect" to give the true temperature of each element of the target scan.

* * * * *